US007611414B2

(12) United States Patent
Mueller et al.

(10) Patent No.: US 7,611,414 B2
(45) Date of Patent: Nov. 3, 2009

(54) TORQUE LIMITING CLUTCHES FOR POWER TRANSFER UNITS

(75) Inventors: Joseph G. Mueller, Manlius, NY (US); Scott R. Moll, LaFayette, NY (US); Brent A. Cring, Cleveland, NY (US); John A. DeSilvia, Jordan, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 353 days.

(21) Appl. No.: 11/626,542

(22) Filed: Jan. 24, 2007

(65) Prior Publication Data

US 2007/0191117 A1 Aug. 16, 2007

Related U.S. Application Data

(60) Provisional application No. 60/772,788, filed on Feb. 13, 2006.

(51) Int. Cl.
*F16D 7/04* (2006.01)

(52) U.S. Cl. ........................................ 464/38; 475/204

(58) Field of Classification Search .................. 464/36, 464/38, 39; 180/248; 475/204
See application file for complete search history.

(56) References Cited

U.S. PATENT DOCUMENTS

| | | | | |
|---|---|---|---|---|
| 998,615 | A * | 7/1911 | Huneke | 464/38 X |
| 1,445,272 | A | 2/1923 | Gill | |
| 2,977,779 | A | 4/1961 | Steinke et al. | |
| 3,901,092 | A | 8/1975 | Romick | |
| 4,075,910 | A | 2/1978 | Davis et al. | |
| 4,128,023 | A | 12/1978 | Kinder | |
| 4,132,297 | A | 1/1979 | Brown et al. | |
| 4,468,206 | A | 8/1984 | Herchenbach et al. | |
| 4,561,855 | A | 12/1985 | Kondo | |
| 4,610,339 | A | 9/1986 | Ciolli | |
| 4,762,021 | A | 8/1988 | Teraoka | |
| 5,342,241 | A | 8/1994 | Kampf | |
| 5,551,917 | A | 9/1996 | Wood | |
| 6,155,395 | A | 12/2000 | Braford, Jr. | |
| 6,305,515 | B1 | 10/2001 | Heidenreich et al. | |
| 6,575,282 | B2 | 6/2003 | Perlick et al. | |
| 6,623,395 | B2 | 9/2003 | Lovatt | |
| 7,018,296 | B2 | 3/2006 | Rauschenbach et al. | |

* cited by examiner

*Primary Examiner*—Greg Binda
(74) *Attorney, Agent, or Firm*—Harness, Dickey & Pierce, P.L.C.

(57) ABSTRACT

A power transfer unit is provided with a torque limiting assembly that limits the torque transferred to driveline components when torque peaks occur. The power transfer unit can include, a first shaft, a second output shaft receiving drive torque, a second output shaft, and a torque transfer mechanism. The torque transfer mechanism includes a coupling member and a biasing member. The coupling member is located between a driving member and a driven member and provides selective engagement therebetween when in an engaged position. The driving member and/or the driven member includes a recess therein receiving a portion of the coupling member when in the engaged position. The biasing member urges the coupling member and the driving member and/or driven member into the engaged position.

23 Claims, 10 Drawing Sheets

TORQUE LIMITING CLUTCHES FOR POWER TRANSFER UNITS

CROSS REFERENCE

This application claims the benefit of U.S. Provisional Application Ser. No. 60/772,788 filed Feb. 13, 2006, the entire disclosure of which is incorporated by reference.

FIELD

The present disclosure relates to power transfer units for use in motor vehicles and, more particularly, to torque limiting clutches for use in such power transfer units.

BACKGROUND

The statements in this section merely provide background information related to the present disclosure and may not constitute prior art.

In view of increased consumer popularity in four-wheel drive and all-wheel drive vehicles, a plethora of power transfer systems are currently being utilized in vehicular driveline applications for selectively directing power (i.e., drive torque) from the powertrain to all four wheels of the vehicle. In many power transfer systems, a power transfer unit, such as a transfer case, is incorporated into the driveline and is operable for delivering drive torque from the powertrain to both the front and rear wheels. Many conventional transfer cases are equipped with a mode shift mechanism that can be selectively actuated to shift between a two-wheel drive mode and a four-wheel drive mode.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is typically maintained in a non-actuated condition such that drive torque is only delivered to the rear wheels. However, when the sensors detect a low traction condition, the clutch assembly is automatically actuated to deliver torque "on-demand" to the front wheels. Moreover, the amount of drive torque transferred through the clutch assembly to the non-slipping wheels can be varied as a function of specific vehicle dynamics, as detected by the sensor arrangement. This on-demand clutch control system can also be used in full-time transfer cases to automatically bias the torque ratio across an interaxle differential.

Notwithstanding significant sales of four-wheel drive and all-wheel drive vehicles, much emphasis is directed to improving vehicle performance and fuel efficiency while at the same time reducing weight. In conflict with this emphasis is the need to engineer the components of power transfer units to meet all torque requirements anticipated for the vehicle application. Specifically, the components must be sized to survive during torque peak conditions despite the fact that such peak conditions rarely occur during typical use of the motor vehicle. Thus, a need exists to limit the maximum torque transferred by a power transfer unit so as to permit the components to be smaller in size and weight.

SUMMARY

A power transfer unit for use in motor vehicles is provided with a torque limiting coupling that limits the drive torque transferred to the driveline when torque peaks occur. The power transfer unit includes an input member driven by the powertrain, an output member driving the driveline, and a torque limiting coupling disposed between the input member and the output member. The torque limiting coupling includes a spring-biased drive connection between the input member and the output member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
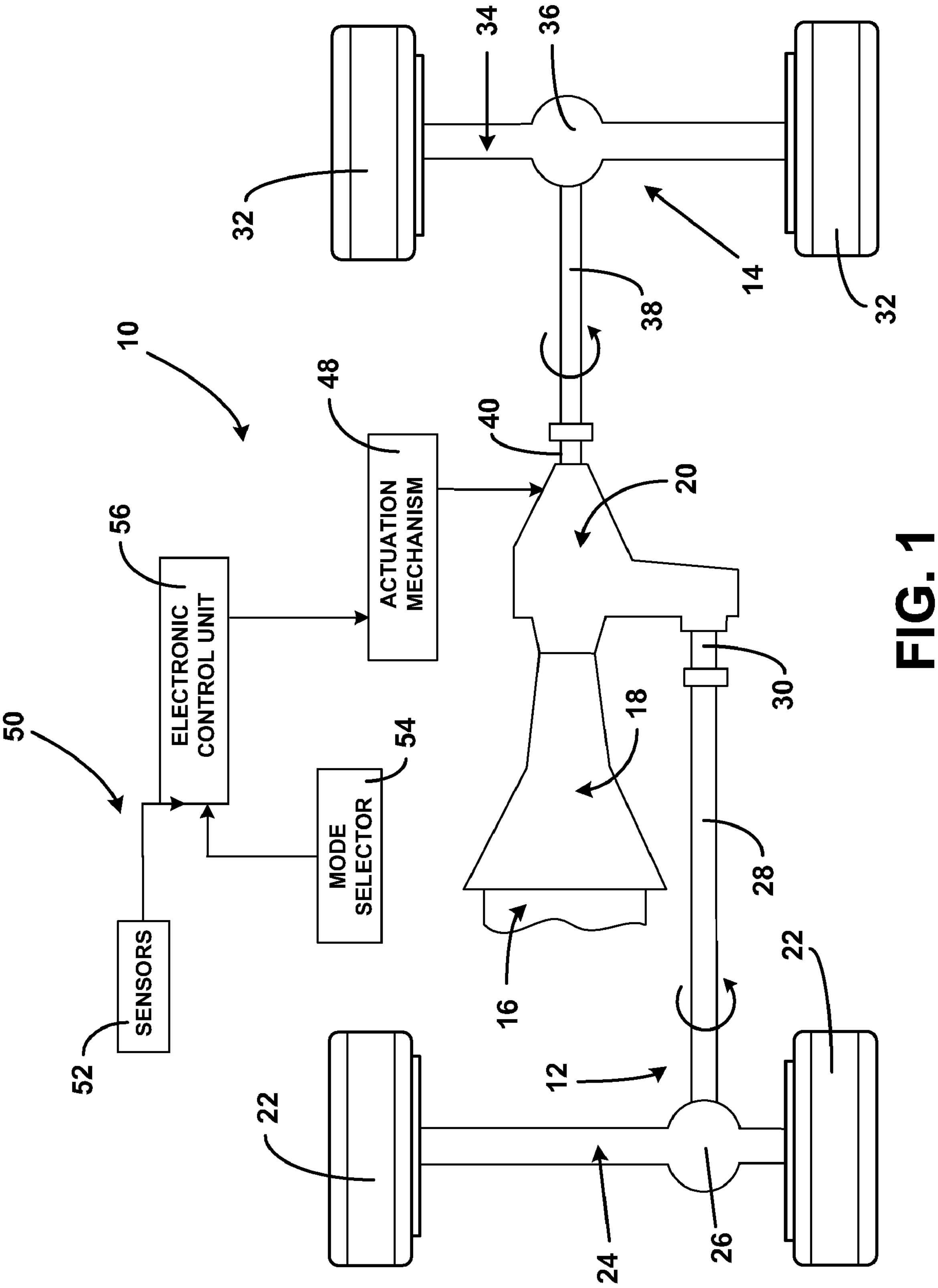
FIG. 1 is a schematic view of a four-wheel drive vehicle equipped with a power transfer unit having an actively-controlled torque transfer clutch and a control system according to the present invention.

The following description is merely exemplary in nature and is not intended to limit the present disclosure, application, or uses.

Referring now to the drawings, a four-wheel drive vehicle 10 is schematically shown to include a front driveline 12 and a rear driveline 14 both drivable from a powertrain. The powertrain is shown to include an engine 16 and a transmission 18 which may be of either the manual or automatic type. In the particular embodiment shown, vehicle 10 further includes a power transfer unit, hereinafter referred to as transfer case 20, that is operable for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be further detailed with reference to FIG. 2, transfer case 20 is equipped with a two-speed range unit 42, an inter-axle differential 44, a clutch assembly 46 and a power-operated actuation mechanism 48 operable to control coordinated shifting of range unit 42 and adaptive engagement of clutch assembly 46. In addition, as shown in FIG. 1, a control system 50 is provided for controlling actuation of actuation mechanism 48. Control system 50 includes sensors 52 for detecting real time operational characteristics of motor vehicle 10, a mode selector 54 for permitting the vehicle operator to select one of the available drive modes and an electronic control unit 56 operable to generate control signals in response to input signals from sensors 52 and mode signals from mode selector 54. The control signals are sent to an electric motor assembly 58 (FIG. 2) associated with actuation mechanism 48.

Figure 2:
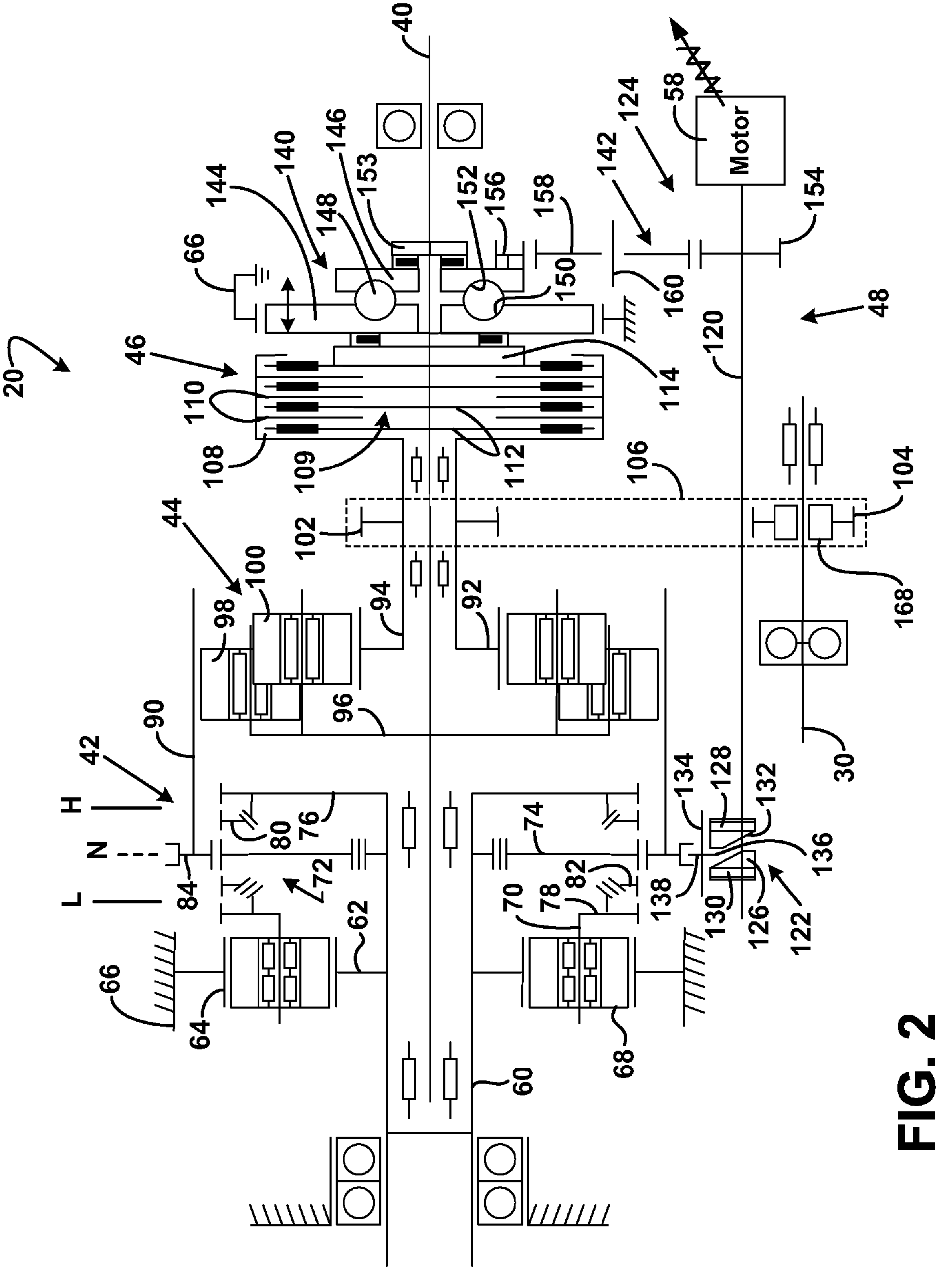
FIG. 2 is a schematic diagram of the power transfer unit of FIG. 1, defining a full-time two-speed transfer case equipped with a torque limiting coupling according to the present invention.

With particular reference to FIG. 2, transfer case 20 is schematically shown to include an input shaft 60 adapted to be driven by the output of transmission 18. Range unit 42 includes a planetary gearset having a sun gear 62 driven by input shaft 60, a ring gear 64 fixed to a stationary housing 66 and planet gears 68 rotatably supported by a planet carrier 70. Planet gears 68 are meshed with both sun gear 62 and ring gear 64. Range unit 42 further includes a synchronized dog clutch assembly 72 having a clutch hub 74 journalled on input shaft 60, a first clutch plate 76 fixed for rotation with input shaft 60 and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78 and a shift collar 84 splined for rotation with and bi-directional axial sliding movement on clutch hub 74.

Shift collar 84 is shown in its neutral (N) position where it is disengaged from both first clutch plate 76 and second clutch plate 78. Shift collar 84 is moveable from its N position to a high-range (H) position whereat shift collar 84 is coupled to first clutch plate 76 and is driven at a direct speed ratio relative to input shaft 60. In contrast, shift collar 84 can be moved from its N position to a low-range (L) position whereat shift collar 84 is coupled to second clutch plate 78 and is driven by planet carrier 70 at a reduced speed ratio relative to input shaft 60. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position.

Interaxle differential 44 includes an input member driven by shift collar 84, a first output member driving rear output shaft 40 and a second output member operably arranged to drive front output shaft 30. In particular, differential 44 includes an annulus gear 90 fixed for rotation with shift collar 84, a sun gear 92 fixed to a quill shaft 94 rotatably supported on rear output shaft 40, and a pinion carrier 96 fixed to rear output shaft 40 which rotatably supports meshed pairs of first pinion gears 98 and second pinion gears 100. In addition, first pinion gears 98 are meshed with annulus gear 90 and second pinion gears 100 are meshed with sun gear 92. As such, driven rotation of annulus gear 90 (at either of the direct or reduced speed ratios) causes drive torque to be transmitted to rear output shaft 40 via pinion carrier 96 and to quill shaft 94 via sun gear 92. Drive torque is transferred from quill shaft 94 to front output shaft 30 via a chain drive assembly which includes a drive sprocket 102 fixed to quill shaft 94, a driven sprocket 104 and a drive chain 106 meshed with sprockets 102 and 104. Based on the particular configuration of inter-axle differential 44, a specific torque distribution ratio is established (i.e., 50/50, 64/36) between rear output shaft 40 and front output shaft 30. However, the magnitude of the torque transfer from driven sprocket 104 to front output shaft 30 is limited by a torque limiting coupling 168 as discussed below.

With continued reference to FIG. 2, clutch assembly 46 is shown to be a multi-plate friction clutch comprised of a clutch drum 108 fixed to quill shaft 94, a clutch pack 109 having outer clutch rings 110 splined for rotation with clutch drum 108 which are interleaved with inner clutch rings 112 splined to rear output shaft 40, and an apply plate 114 for applying an axially-directed clutch engagement force on clutch pack 109.

Power-operated actuation mechanism 48 is operable to cause movement of shift collar 84 between its three distinct positions as well as to generate the clutch engagement force exerted on clutch pack 109 of clutch assembly 46. In its most basic sense, actuation mechanism 48 includes motor assembly 58, a drive shaft 120 rotatively driven by the output of motor assembly 58, a range actuator assembly 122 and a clutch actuator assembly 124. Motor assembly 58 is preferably an electric gearmotor equipped with an encoder capable of accurately sensing the rotated position of driveshaft 120. Range actuator assembly 122 includes a range cam 126 fixed for rotation with drive shaft 120. Cam 126 is cylindrical and includes a high-range circumferential groove 128, a low-range circumferential groove 130 and a spiral intermediate groove 132 connecting circumferential grooves 128 and 130. Range actuator assembly 122 further includes a range fork 134 having a follower segment 136 shown retained in spiral groove 132 and a fork segment 138 retained in an annular groove formed on shift collar 84.

As will be appreciated, rotation of range cam 126 results in axial movement of shift collar 84 due to retention of follower segment 136 in spiral groove 132. Specifically, rotation of drive shaft 120 in a first direction causes concurrent rotation of range cam 126 which, in turn, causes follower segment 136 to move within spiral groove 132 until shift collar 84 is located in its H position. At this position, follower segment 136 enters high-range dwell groove 128 which permits continued rotation of drive shaft 120 in the first direction while shift collar 84 is retained in its H position with the high-range drive connection established between input shaft 60 and annulus gear 90. Thereafter, rotation of drive shaft 120 and range cam 126 in the opposite second direction causes follower segment 136 to exit high-range dwell groove 128 and re-enter intermediate spiral groove 132 for causing shift collar 84 to begin moving from the H position toward its L position. Upon continued rotation of range cam 126 in the second direction, follower segment 136 exits spiral groove 132 and enters low-range dwell groove 130 for locating shift collar 84 in its L position and establishing the low-range drive connection between planet carrier 70 and annulus gear 90.

Clutch actuator assembly 124 is also driven by motor assembly 58 and includes a ball-ramp unit 140 and a gear assembly 142. Ball-ramp unit 140 includes a first ball-ramp plate 144, a second ball-ramp plate 146 and a plurality of balls 148 disposed in ramped grooves 150 and 152 formed in corresponding face surfaces of plates 144 and 146. First ball-ramp plate 144 is non-rotatably secured to housing 66 and is supported for bi-directional axial movement. Specifically, first ball-ramp plate 144 is shown to coaxially surround rear output shaft 40 and is arranged to move axially for exerting an axially-directed clutch engagement force on apply plate 114 for frictionally engaging clutch pack 109. A thrust bearing is shown located between apply plate 114 and first ball-ramp plate 144 for permitting relative rotation therebetween. Second ball-ramp plate 146 also coaxially surrounds rear output shaft 40 and is supported for limited rotation relative to first ball-ramp plate 144. Second ball-ramp plate 146 is axially restrained relative to rear output shaft 40 via a backing plate 153 and a thrust bearing is shown located therebetween. As such, relative rotation between ball-ramp plates 144 and 146 causes balls 148 to travel along ramped grooves 150 and 152 which, in turn, acts to control the axial position of second ball-ramp plate 146 relative to clutch pack 109, thereby controlling the magnitude of the clutch engagement force exerted thereon.

Gear assembly 142 includes a first gear 154 fixed for rotation with drive shaft 120, a second gear 156 fixed to second ball-ramp plate 146 and a third gear 158 rotatably supported on an idlershaft 160 and which is meshed with both first gear 154 and second gear 156. Preferably, second gear 156 is an arcuate gear segment formed integrally with, or rigidly secured to, an outer face surface of second ball-ramp plate 146. The profile of ramped grooves 150 and 152 and the gear ratio established by gear assembly 142 between drive shaft 120 and second ball-ramp plate 146 are designed to permit bi-directional rotation of drive shaft 120 through a range of travel sufficient to permit shift collar 84 to move between its H and L positions without any significant clutch engagement force being transmitted by ball-ramp unit 140 to clutch assembly 46. However, additional bi-directional rotation of drive shaft 120, as accommodate by dwell grooves 128 and 130 in range cam 126, is designed to cause axial movement of second ball-ramp plate 146 between an "adapt-ready" position and a "locked" position. In the adapt-ready position, a minimum clutch engagement force is exerted on clutch pack 109 such that clutch assembly 46 is considered to be non-actuated. Preferably, this clutch engagement force applies a preload on clutch pack 109 to eliminate driveline clunk and permit instantaneous clutch actuation. Conversely, in the locked position, a maximum clutch engagement force is exerted on clutch pack 109 and clutch assembly 46 is considered to be fully engaged. Thus, by varying the position of second ball-ramp plate 146 between its adapt-ready and locked position, the torque bias across differential 44 can be continuously modulated to provide automatic clutch control of clutch assembly 46 in a range between its released and fully engaged conditions.

Control system 50 is provided to control the rotated position of drive shaft 120 in response to the mode signal delivered to ECU 56 by mode selector 54 and the sensor input signals sent by sensors 52. While sensors 52 can provide numerous indicators (i.e., shaft speeds, vehicle speed, acceleration/throttle position, brake status, etc.), it is contemplated that clutch assembly 46 is controlled, at a minimum, in response the magnitude of interaxle slip (ΔRPM) between output shafts 40 and 30. Mode selector 54 permits selection of one an Automatic Full-Time four-wheel high-range (Auto-4WH) drive mode, a Neutral mode, and a Locked four-wheel low-range (Lock-4WL) drive mode. In the Auto-4WH mode, shift collar 84 is located in its H position and the torque biasing generated by clutch assembly 46 is continuously modulated based on value of the sensor signals. In the Lock-4WL mode, shift collar 84 is in its L position and clutch assembly 46 is fully engaged. In the Neutral mode, shift collar 84 is in its N position and clutch assembly 46 is released. Obviously, other available drive modes can be provided if desired. For example, a Locked four-wheel high-range (LOCK-4WH) drive mode can be established by locating shift collar 84 in its H position and fully engaging clutch assembly 46.

While power-operated actuation mechanism 48 has been disclosed in association with a full-time transfer case, it will be understood that differential 44 could be eliminated such that clutch assembly 46 would function to modulate the drive torque transferred directly from rear output shaft 40 to front output shaft 30 and establish an on-demand four-wheel drive mode.

Figure 3:
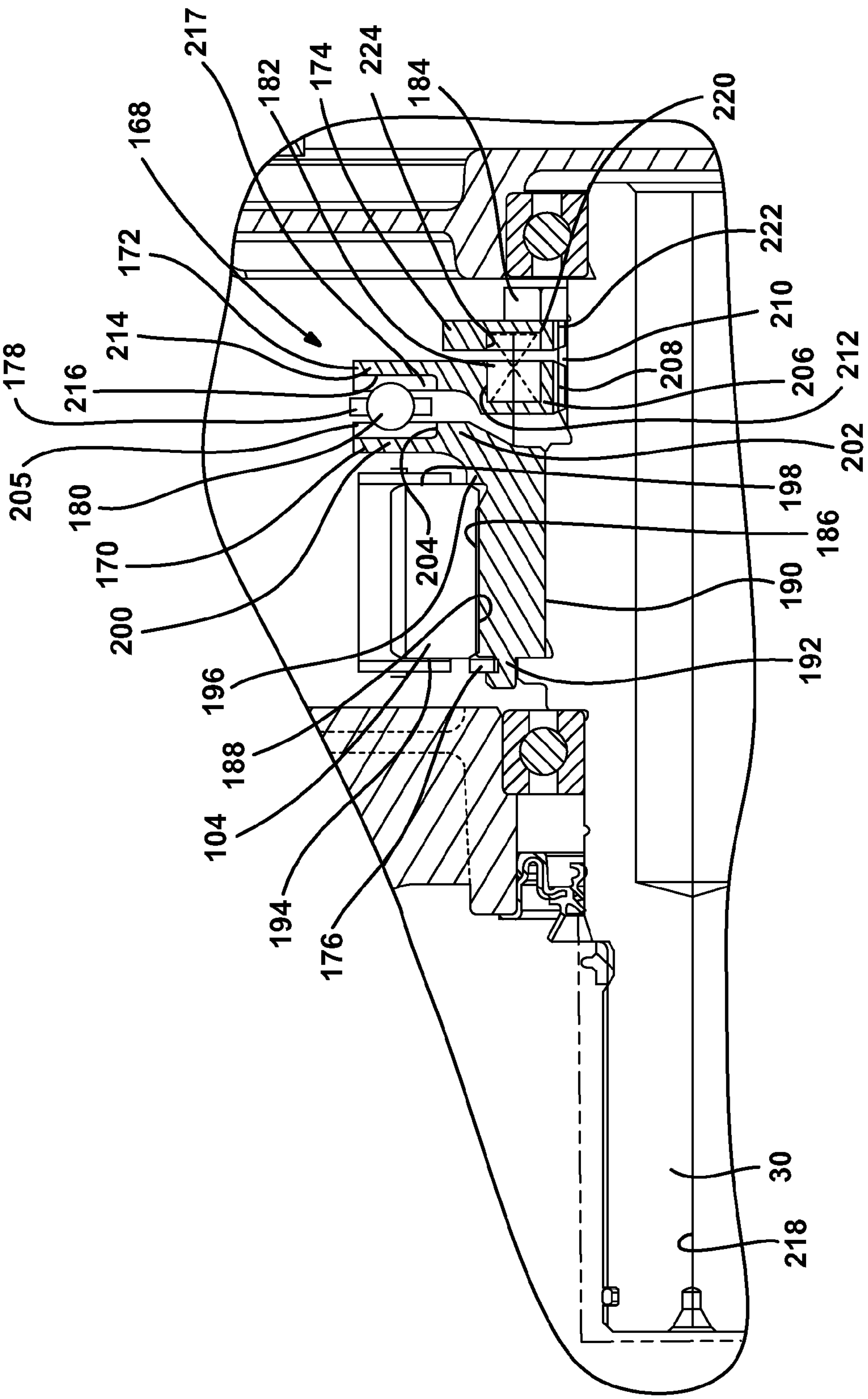
FIG. 3 is a sectional view of a first embodiment of the torque limiting coupling shown in FIG. 2.

With reference to FIG. 3, a first torque limiting device or coupling 168 is disposed to transfer drive torque between driven sprocket 104 and front output shaft 30. Torque limiting device 168 includes engagement members 170, 172 and 174, a C-ring 176, a retaining ring 178, balls 180, a spring 182 and a nut 184. First engagement member 170 is a drive component coupled for rotation with driven sprocket 104 and includes a splined outer surface 186 in meshed engagement with an inner splined surface 188 of driven sprocket 104. First engagement member 170 includes an inner surface 190 generally adjacent to and rotatable relative to front output shaft 30. C-ring 176 extends around a first end portion 192 of first engagement member 170 and generally abuts a first end portion 194 of driven sprocket 104, thereby preventing axial travel in a first direction relative to driven sprocket 104. First engagement member 170 includes a shoulder 196 extending in proximity to and generally abutting a second end portion 198 of driven sprocket 104, thereby preventing axial travel of first engagement member 170 in a second axial direction relative to driven sprocket 104. As seen, a second end portion 202 of first engagement member 170 is formed to define a flange ring 200. Flange ring 200 includes a plurality of circumferentially aligned and axially extending recesses 204 that are separated by ratchet lugs 205.

Second engagement member 172 is a driven component that is axially offset from first engagement member 170 and fixed for rotation with front output shaft 30. Specifically, second engagement member 172 includes a radially inner hub segment 206 having a splined inner surface 208 engaged with a splined outer surface 210 of front output shaft 30. An annular chamber 212 is formed in hub segment 206. A radial ring segment 214 of second engagement member 172 includes a plurality of circumferentially aligned and axially extending recesses 216 that are separated by ratchet lugs 217. Recesses 216 are located a distance radially from the axis of rotation 218 of front output shaft 30 that is generally similar to that of recesses 204 formed in first engagement member 172.

Third engagement member 174 is axially offset from second engagement member 172 and includes a hub segment 220 having a splined inner surface 222 engaged with splined outer surface 210 of front output shaft 30. A annular chamber 224 is formed in hub segment 220 that generally faces and is aligned with chamber 212. Spring 182 is disposed within annular chambers 212 and 224 to apply an axially directed biasing force on second engagement member 172, thereby establishing a spring-biased engagement of balls 180 within recesses 204 and 216. The magnitude of this "preload" biasing force can be adjusted by axially moving third engagement member 174 toward second engagement member 172 by adjusting the position of nut 184 on a threaded portion of front output shaft 30. Such adjustment acts to compress spring 182 and forcible urge second engagement member 172 axially toward first engagement member 170.

Retaining ring 178 generally contains the plurality of balls 180 therein. Retaining ring 178 and balls 180 are located between first engagement member 170 and second engagement member 172. During normal operation, balls 180 are located between pairs of aligned recesses 204 and 216 such that drive torque from driven sprocket 104 is transferred through first engagement member 170, balls 180 and second engagement member 172 to drive front output shaft 30. However, during torque peaks, balls 180 may slip and become disengaged or ratchet over one or both of ratchet lugs 205 and 217. First engagement member 170 may therefore rotate relative to second engagement member 172 for causing balls 180 to engage successive recesses in each of first and second engagement members 170 and 172.

Figure 4:
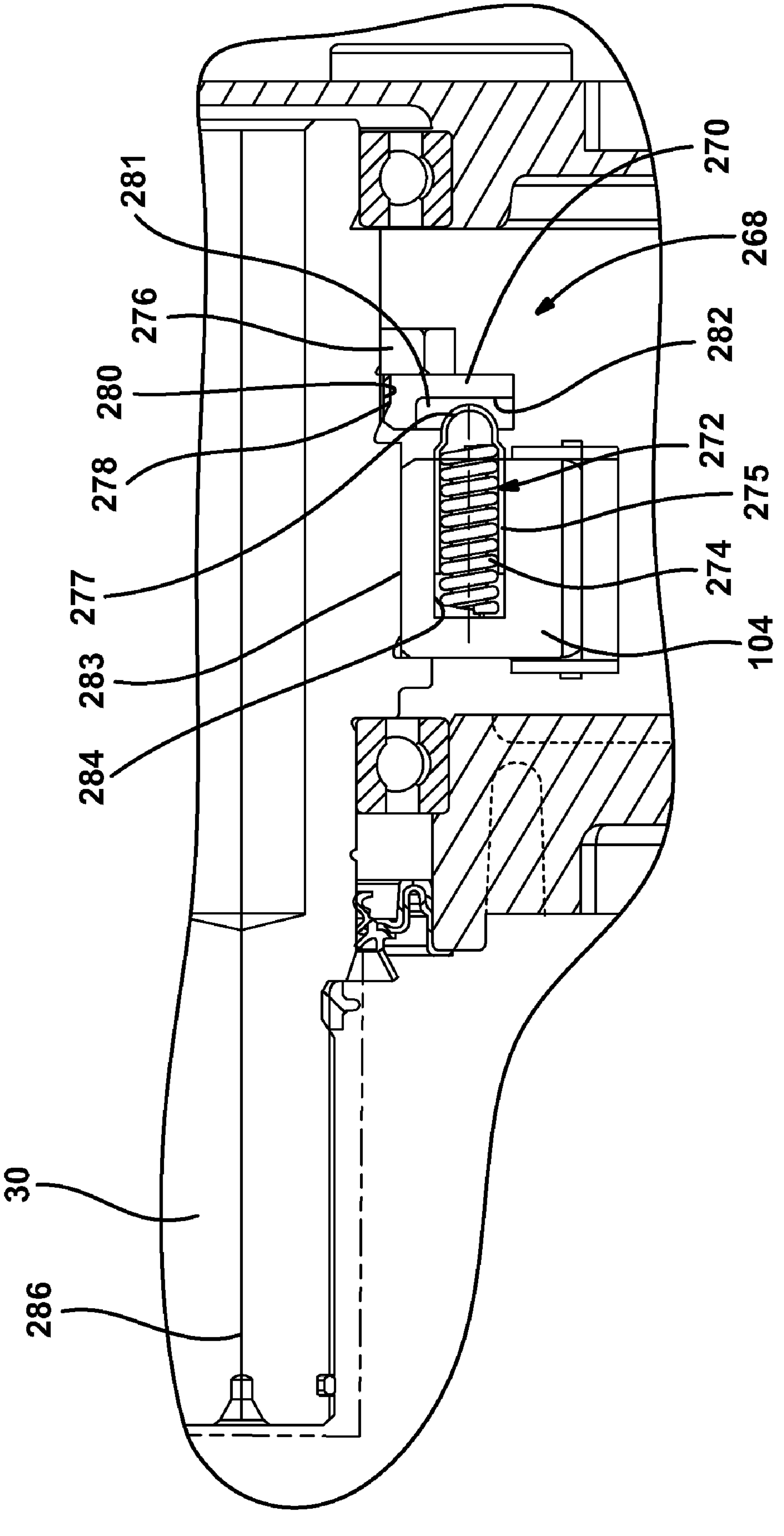
FIG. 4 is a sectional view of a second embodiment of the torque limiting coupling shown in FIG. 2.

In accordance with a second embodiment, a second torque limiting coupling or device 268, as shown in FIG. 4, may be used in place of torque limiting coupling 168. Torque limiting coupling 268 includes an engagement member 270, a plurality of roller poppets 272, a plurality of springs 274 and a nut 276. Engagement member 270 is axially offset from driven sprocket 104 and includes a splined inner surface 278 engaged with a splined outer surface 280 of front output shaft 30. Engagement member 270 generally abuts nut 276, thereby preventing axial movement in a first direction away from roller poppet 272. Engagement member 270 also includes a plurality of circumferentially aligned recesses 282 extending toward driven sprocket 104 and which are separated by ratchet lugs 281. Driven sprocket 104 has an inner surface 283 generally supported for rotation relative to front output shaft 30. Driven sprocket 104 includes a plurality of circumferentially aligned bores 284 each housing one of roller poppets 272 and springs 274 therein. Roller poppets 272 each include a tubular body portion 275 located within bores 284 and a rounded end portion 277 extending axially outwardly therefrom. Bores 284 are located a distance radially from the axis of rotation 286 of front output shaft 30 that is generally similar to that of recesses 282. Springs 274 are arranged to urge end portions 277 of roller poppets 272 axially outwardly and into recesses 282, thereby providing a driving engagement between front output shaft 30 and driven sprocket 104.

During normal operation, roller poppets 272 cause front output shaft 30 to rotate with driven sprocket 104. However, during torque peaks, roller poppets 272 may slip and become disengaged from recesses 282. Driven sprocket 104 may therefore rotate relative to front output shaft 30 and engagement member 270 causing roller poppets 272 to engage successive recesses (not shown) in engagement member 270 until the torque peak condition is eliminated.

Roller poppets 272 are be axially biased a predetermined amount by springs 274. Springs 274 provide an axial force on roller poppets 272. This axial preload force may be modified by nut 276 adjusting the axial position of engagement member 270, thereby altering the installed length and therefore the preload, of springs 274.

Figure 5:
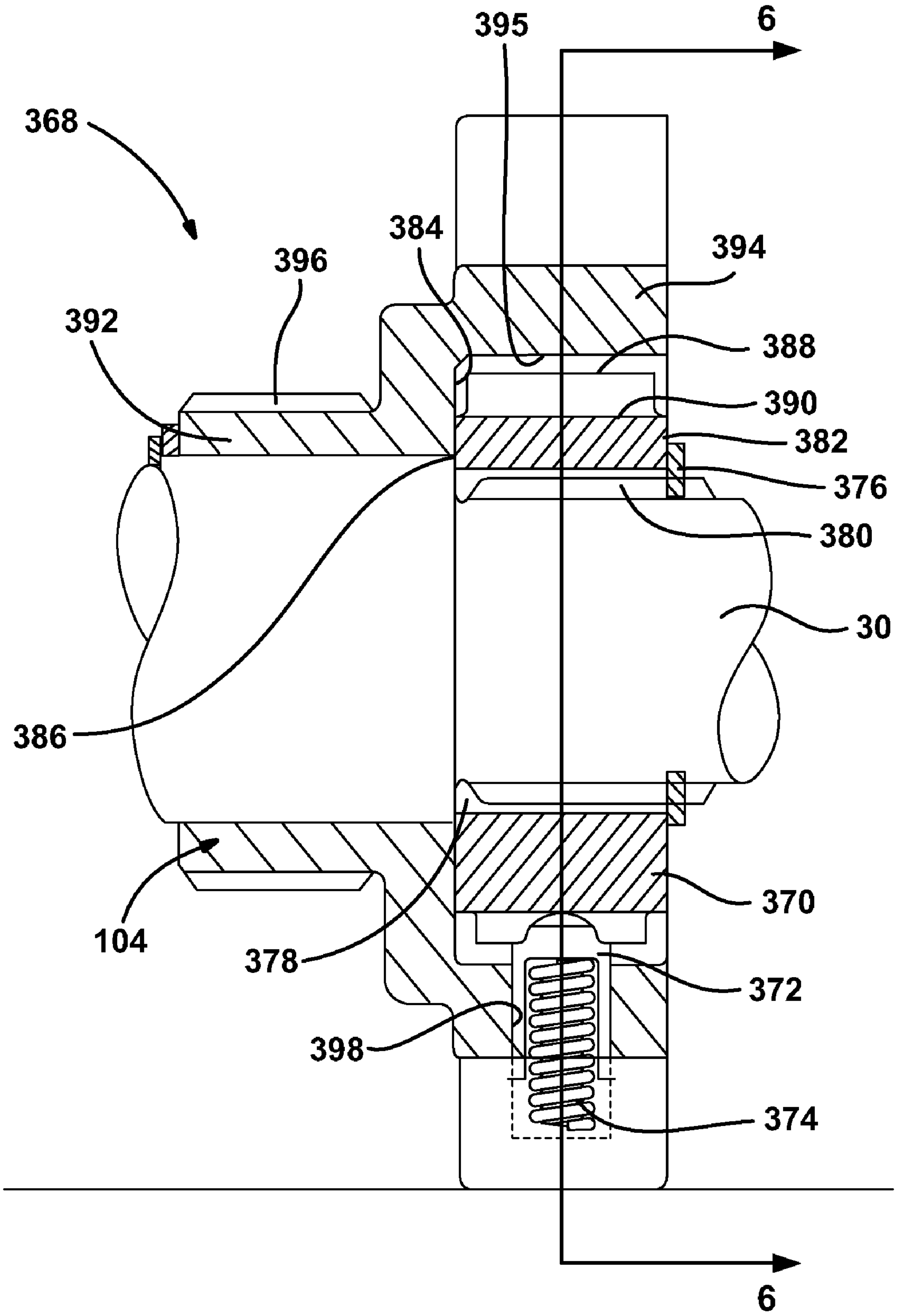
FIG. 5 is a sectional view of a third embodiment of the torque limiting coupling shown in FIG. 2.
Figure 6:
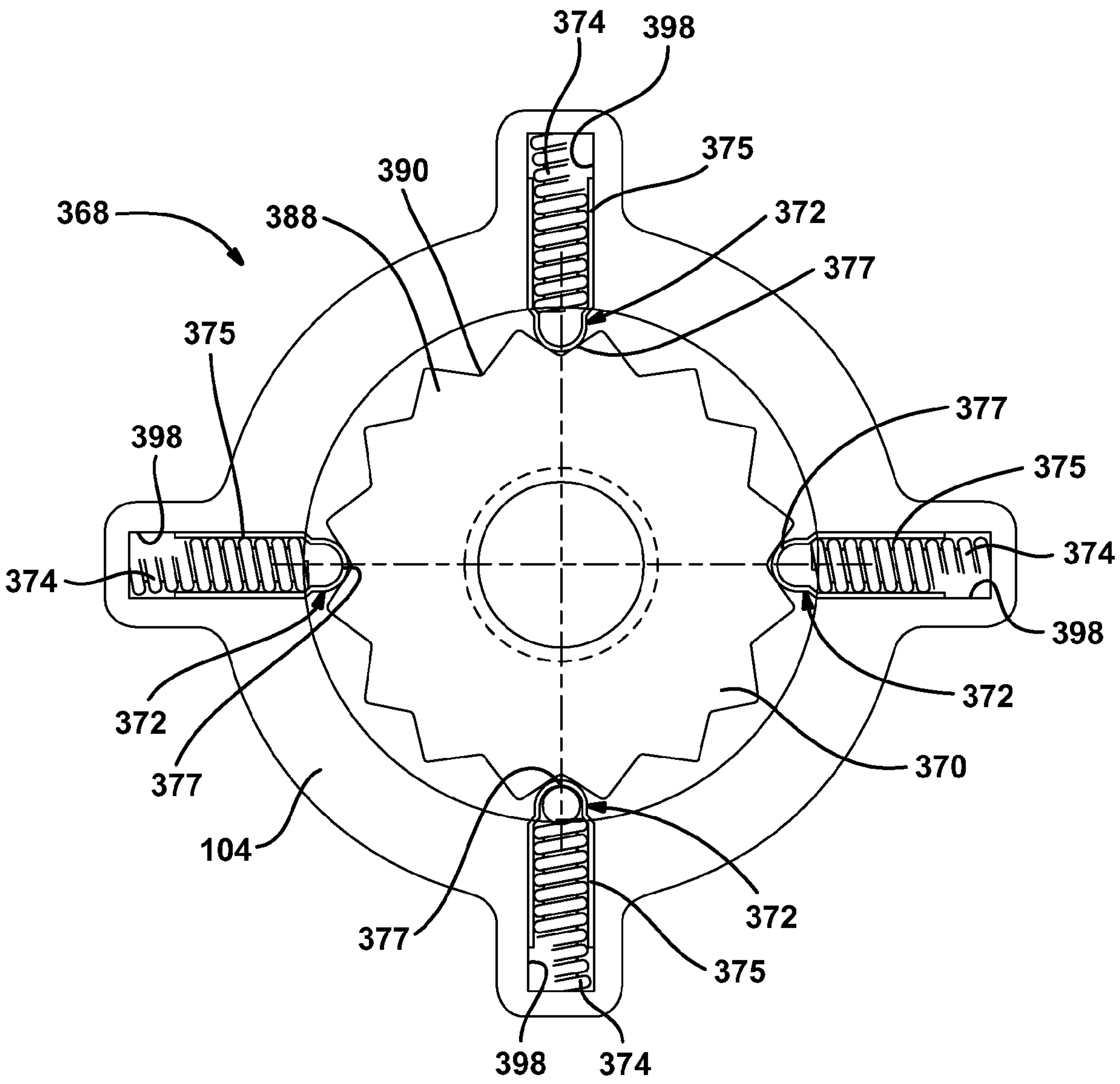
FIG. 6 is a sectional view taken generally along line 6-6 of FIG. 5.

Pursuant to a third embodiment, a third torque limiting coupling or device 368, as shown in FIGS. 5 and 6, may be used in place of torque limiting device 168 and includes an engagement member 370, roller poppets 372 and springs 374. Engagement member 370 includes a splined inner surface 378 engaged with an outer splined surface 380 of front output shaft 30. Engagement member 370 is generally prevented from axial travel in a first direction by a C-ring 376 encircling front output shaft 30 and abutting a first end portion 382 of engagement member 370. Axial travel of engagement member 370 is prevented in a second direction by abutting engagement between an inner surface 384 of driven sprocket 104 and a second end portion 386 of engagement member 370. Engagement member 370 includes an alternating arrangement of protrusions 388 and recesses 390, each preferably having a generally V-shaped cam-type ratchet configuration.

Driven sprocket 104 includes a first portion 392 that is axially offset from engagement member 370 and a second portion 394 defining an annular chamber 395 surrounding engagement member 370. First portion 392 includes teeth 396 for engagement with drive chain 106. Alternatively, an engagement portion (not shown) could be located around second portion 394. Driven sprocket 104 further includes a series of bores or recesses 398 which house roller poppets 372 and springs 374. Roller poppets 372 include main body portions 375 that are generally located within bores 398 and rounded end portions 377 extending radially inwardly therefrom. Springs 374 generally urge roller poppets 372 radially inwardly toward engagement member 370.

During normal operation, roller poppets 372 are seated within recesses 390 and cause rotation of front output shaft 30 with driven sprocket 104. However, during torque peaks, roller poppets 370 may slip and become disengaged from recesses 390 and allow rotation of driven sprocket 104 relative to front output shaft 30 until an acceptable torque level is resumed. The torque level resulting in slip can be set by modifying the preload and spring rate of springs 374.

Figure 7:
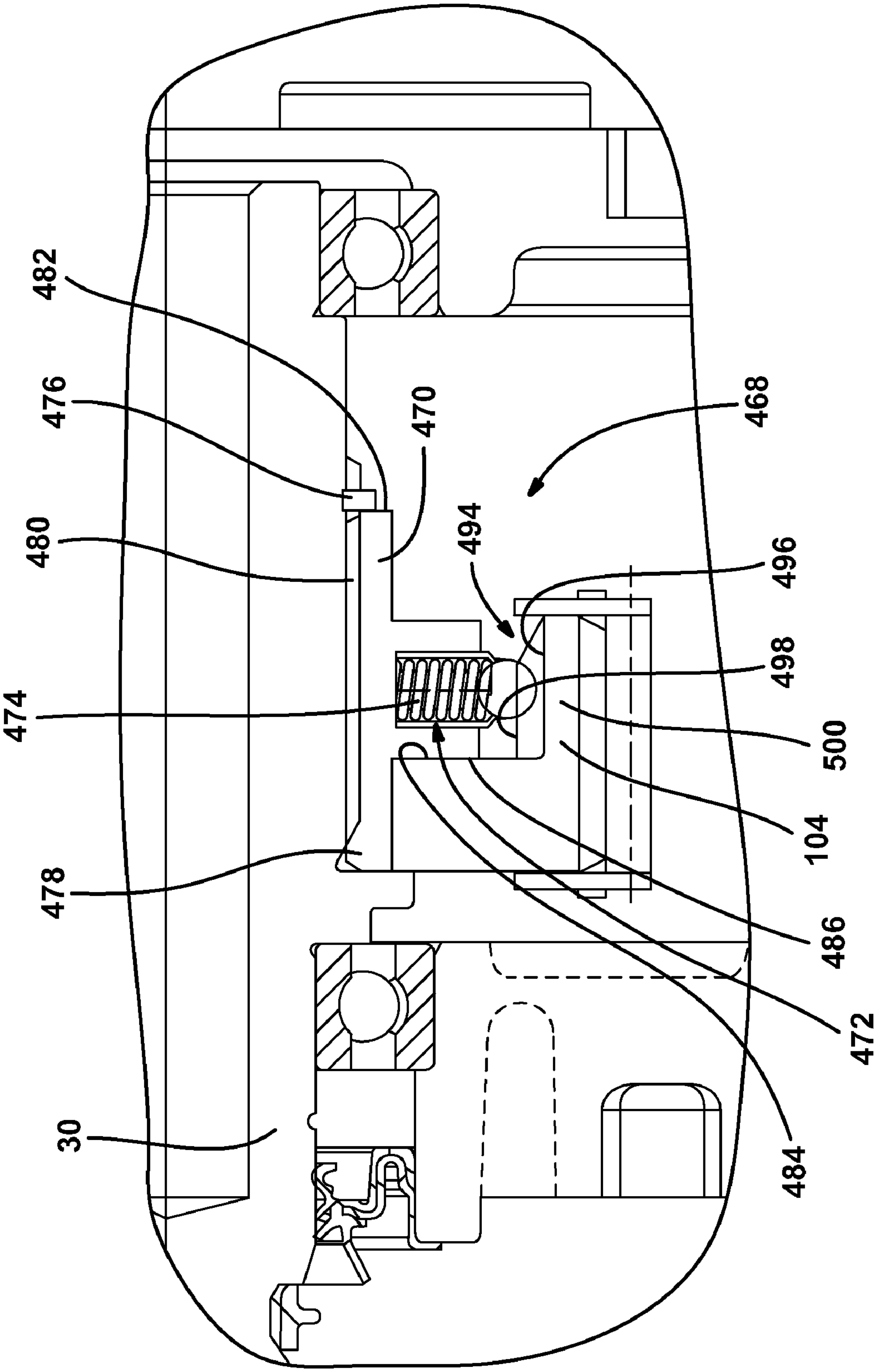
FIG. 7 is a sectional view of a fourth embodiment of the torque limiting coupling shown in FIG. 2.
Figure 8:
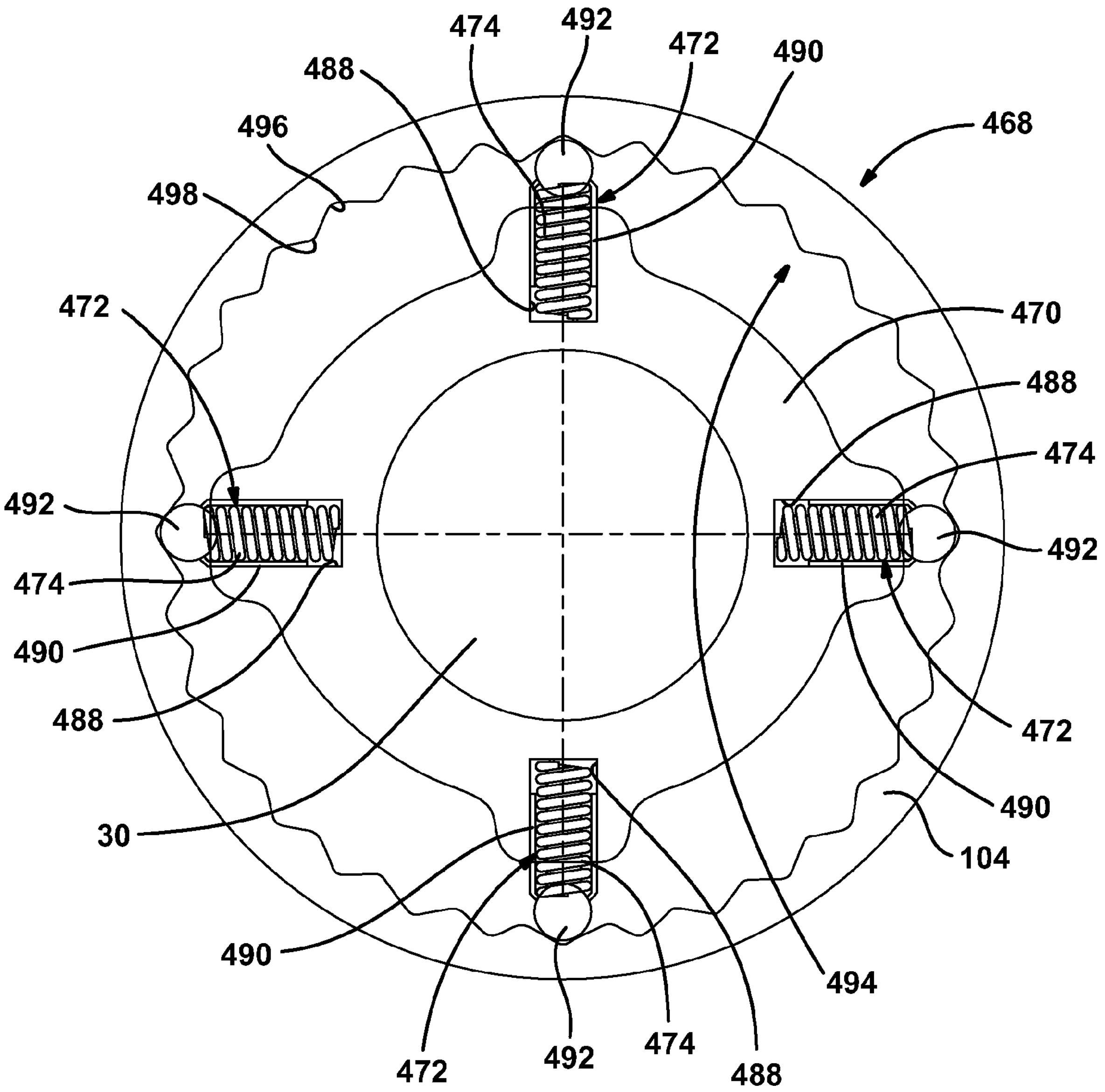
FIG. 8 is an end view of the torque limiting coupling of FIG. 7.

Pursuant to a fourth embodiment, a fourth torque limiting coupling or device 468, as shown in FIGS. 7 and 8, may be used in place of torque limiting device 168. Torque limiting devices 468 include an engagement member 470, roller poppets 472 and springs 474. Engagement member 470 includes a splined inner surface 478 engaged with a splined outer surface 480 of front output shaft 30. Engagement member 470 is generally prevented from axial travel in a first direction by a C-ring 476 mounted to front output shaft 30 and abutting a first end 482 of engagement member 470. Axial travel of engagement member 470 is prevented in a second direction by abutting engagement between an inner surface 484 of driven sprocket 104 and engagement member 470. Engagement member 470 further includes bores or recesses 488 housing roller poppets 472 and springs 474 therein. Roller poppet 472 each include a main body portion 490 generally located in recess 488 and a rounded end portion 492 extending radially outwardly therefrom.

Driven sprocket 104 includes an engagement portion 494 having alternating recesses 496 and protrusions 498, each having a V-shaped cam-like configuration, for engagement with roller poppet rounded end portion 492. Engagement portion 494 is located on an inner surface of a circumferential flange portion 500 of driven sprocket 104 and generally extends around roller poppets 472 and springs 474.

During normal operation, roller poppets 472 are seated within recesses 496 and generally cause rotation of front output shaft 30 with driven sprocket 104. However, during torque peaks, roller poppets 470 may slip and become disengaged from recesses 496 and allow rotation of driven sprocket 104 relative to front output shaft 30 until an acceptable torque level is resumed. The torque level resulting in slip can be set by modifying the preload and spring rate of springs 474.

Figure 9:
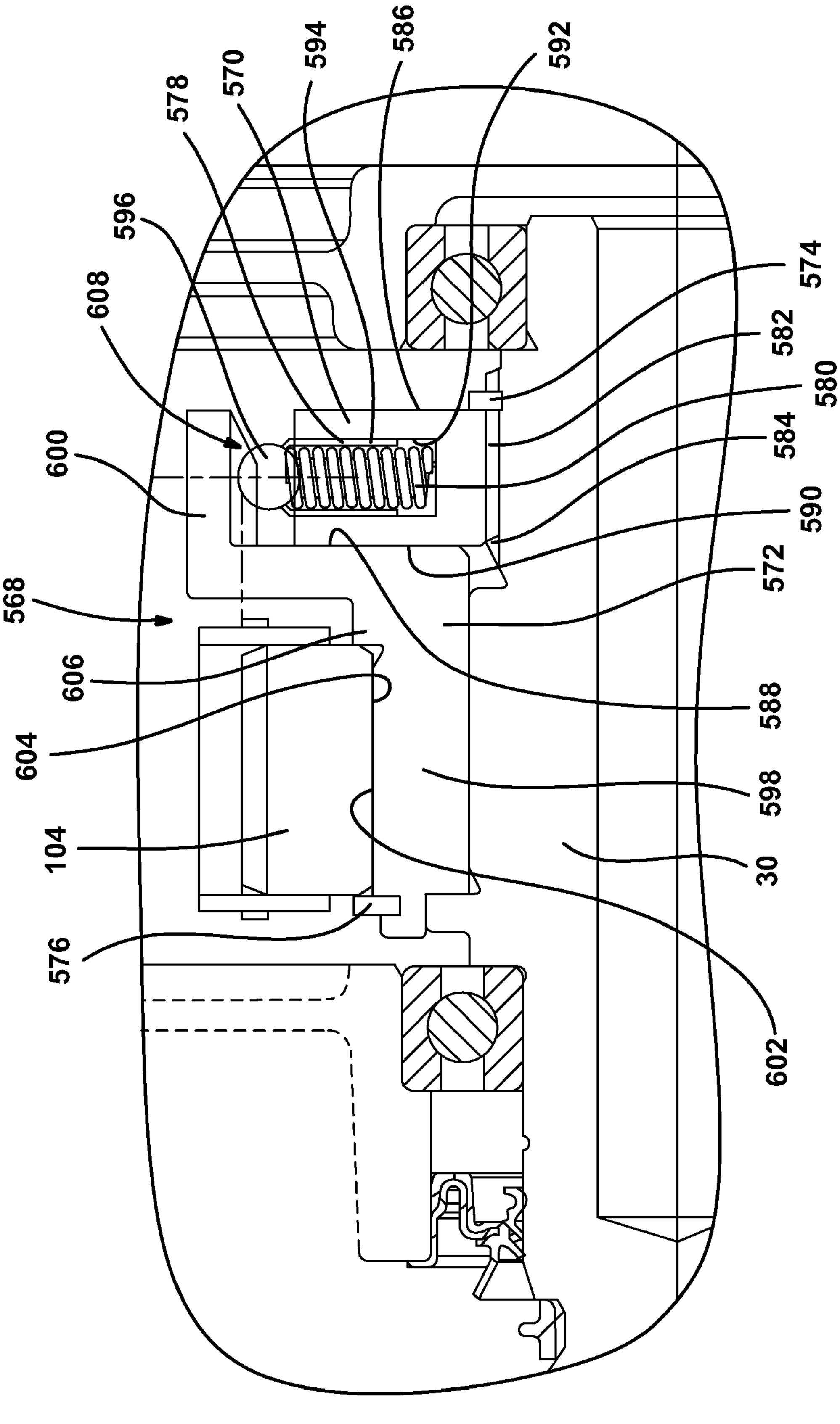
FIG. 9 is a sectional view of a fifth embodiment of the torque limiting coupling shown in FIG. 2.

Pursuant to a fifth embodiment, a fifth torque limiting coupling or device 568, as shown in FIG. 9, may be used in place of torque limiting device 168 and is generally similar in operation to fourth torque limiting device 468 previously discussed. Fifth torque limiting device 568 includes a first engagement member 570, a second engagement member 572, a first C-ring 574, a second C-ring 576, a plurality of roller poppets 578 and a plurality of springs 580.

First engagement member 570 includes a splined inner surface 582 engaged with a splined outer surface 584 of front output shaft 30. Engagement member 570 is generally prevented from axial travel in a first direction by first C-ring 574 located around front output shaft 30 and abutting a first end 586 of first engagement member 570. Axial travel of first engagement member 570 is prevented in a second direction by abutting engagement between a first end 588 of second engagement member 572 and a second end 590 of first engagement member 570. First engagement member 570 further includes a plurality of bores or recesses 592 housing roller poppets 578 and springs 580 therein. Roller poppets 578 include a main body portion 594 generally located in recesses 592 and a rounded end portion 596 extending radially outwardly therefrom.

Second engagement member 572 includes first and second portions 598 and 600, respectively. First portion 598 includes a splined outer surface 602 engaged with a splined inner surface 604 of driven sprocket 104. Driven sprocket 104 is generally prevented from axial travel along splined surface 602 by C-ring 576 and radially extending shoulder 606. Second portion 600 extends radially outwardly from first portion 598 and generally surrounds recess 592 and roller poppet 578. An engagement surface 608 is located on an inner portion thereof and includes alternating recesses and protrusions having a V-shaped configuration (not shown) generally similar to those described above regarding fourth torque limiting device 468. As previously noted operation of torque limiting device 568 is generally similar to that of torque limiting device 468 and therefore will not be discussed in detail.

Figure 10:
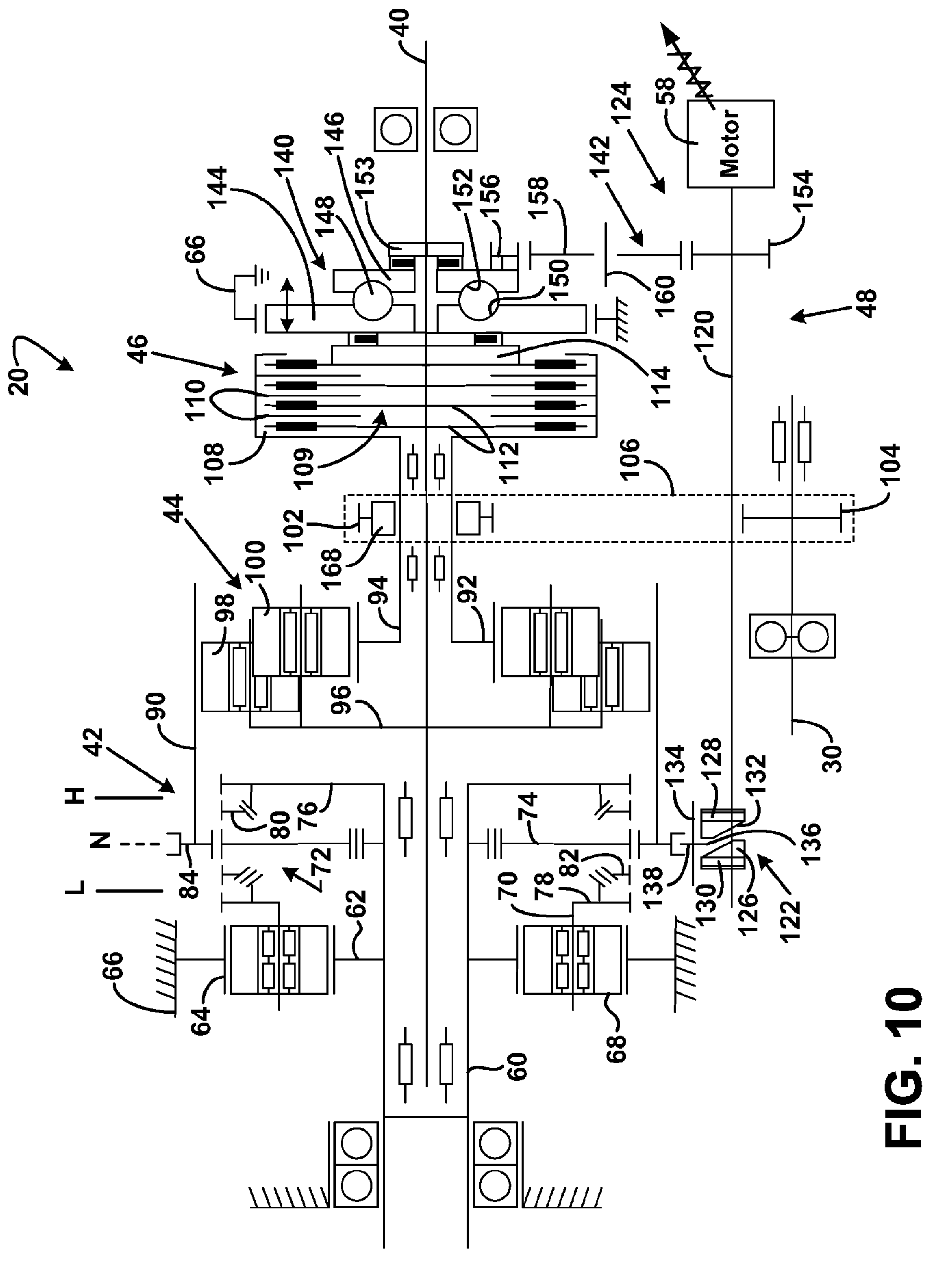
FIG. 10 is a schematic diagram of an alternate example of the full-time two-speed transfer case of FIG. 2.

While torque limiting devices 168, 268, 368, 468 and 568 have been described as allowing torque slippage between driven sprocket 104 and front output shaft 30, it is understood that these arrangements may be used in any appropriate location throughout the system. For example, as shown in FIG. 10, torque limiting device 168 (or any of the other torque limiting device embodiments) may be arranged to provide torque slippage between quill shaft 94 and drive sprocket 102. Furthermore, each embodiment is considered well-suited for use in any power transfer unit of the type used in motor vehicles to limit the maximum torque transferred from a drive rotary member to a driven rotary member.

The above reference embodiments clearly set forth the novel and unobvious features, structure and/or function of the present disclosure. However, one skilled in the art will appreciate that equivalent elements and/or arrangements made be used which will be covered by the scope of the following claims.

What is claimed is:

1. A transfer case comprising:

an input shaft;

a first output shaft receiving drive torque from said input shaft;

a second output shaft in a driven engagement with said first output shaft; and a torque limiting mechanism including a driving member supported for rotation on said second output shaft and driven by said first output shaft, a driven member driven by said second output shaft, a coupling member and a biasing member, said coupling member disposed between said driving member and said driven member and providing engagement therebetween, at least one of said driving member and said driven member having a recess therein receiving a portion of said coupling member, said coupling member being removed from said recess when a torque level applied by said first output shaft to said torque limiting mechanism exceeds a torque limit, said biasing member urging said coupling member and said at least one of said driving member and said driven member into engagement.

2. The transfer case of claim 1 wherein said driving member and said driven member have a common axis of rotation.

3. The transfer case of claim 2 wherein said biasing member is arranged to provide a biasing force in a direction generally radially outwardly from said axis of rotation.

4. The transfer case of claim 2 wherein said biasing member is arranged to provide a biasing force in a direction generally parallel to said axis of rotation.

5. The transfer case of claim 2 wherein said coupling member is radially displaceable relative to said axis of rotation.

6. The transfer case of claim 2, wherein said coupling member is axially displaceable relative to said axis of rotation.

7. The transfer case of claim 1 wherein said biasing member is a spring.

8. The transfer case of claim 1 wherein said coupling member includes a rounded engagement surface.

9. The transfer case of claim 1 wherein said coupling member includes at least one ball.

10. The transfer case of claim 1 wherein said torque limiting mechanism includes an adjustment member in communication with said biasing member and operable to selectively adjust a biasing force of said biasing member.

11. The transfer case of claim 10 wherein said biasing member includes a spring, said adjustment member operable to selectively adjust the installed length of said spring.

12. The transfer case of claim 1 wherein each of said driving member and said driven member includes a recess receiving a portion of said coupling member.

13. The transfer case of claim 1 wherein said coupling member is fixed for rotation with one of said driving member and said driven member.

14. The transfer case of claim 13 wherein the other of said driving member and said driven member includes said recess therein.

15. The transfer case of claim 1 wherein said at least one of said driving member and said driven member having a recess therein includes a plurality of recesses therein.

16. A transfer case comprising:

an input shaft;

a first output shaft in a driven engagement with said input shaft;

a second output shaft in a driven engagement with said first output shaft; and a torque limiting mechanism drivingly disposed between said first output shaft and said second output shaft and including a coupling member and a biasing member, at least one of a driving member and a driven member having a recess therein configured to engage said coupling member, said coupling member being removed from said recess when a torque level applied by said first output shaft to said torque limiting mechanism exceeds a torque limit, said at least one of said driving member and said driven member having said coupling member urged into an engagement therewith by said biasing member.

17. The transfer case of claim 16 wherein said coupling member is fixed for rotation with the other of said driving member and said driven member.

18. The transfer case of claim 16 wherein each of said driving member and said driven member includes a recess therein, said driving member and said driven member each rotatable relative to said coupling member.

19. The transfer case of claim 16 further comprising a two-speed range unit in a driven engagement with said input shaft.

20. The transfer case of claim 16 further comprising an interaxle differential in a driven engagement with said input shaft.

21. The transfer case of claim 16 further comprising a clutch assembly in a driven engagement with said input shaft.

22. A power transfer unit comprising:

a first shaft;

a second shaft; and a torque limiting mechanism drivingly disposed between said first shaft and said second shaft and including a coupling member and a biasing member, at least one of a driving member and a driven member having a plurality of recesses therein configured to engage said coupling member, said coupling member being removed from one of said recesses when a torque level applied by said first shaft to said torque limiting mechanism exceeds a torque limit, said biasing member urging said coupling member into an engaged position within a successive one of said recesses.

23. The power transfer unit of claim 22, wherein said coupling member is fixed for rotation with one of said driving member and said driven member, the other of said driving member and said driven member having said recesses therein.

* * * * *